United States Patent [19]

Tefertiller et al.

[11] 4,233,425

[45] Nov. 11, 1980

[54] ADDITION POLYMERIZABLE POLYETHERS HAVING PENDANT ETHYLENICALLY UNSATURATED URETHANE GROUPS

[75] Inventors: Nancy B. Tefertiller; Kenneth A. Burdett; Robert F. Harris, all of Midland, Mich.

[73] Assignee: The Dow Chemical Company, Midland, Mich.

[21] Appl. No.: 961,000

[22] Filed: Nov. 15, 1978

[51] Int. Cl.$^2$ ............................................. C08L 75/08
[52] U.S. Cl. ............................. 525/455; 204/159.15; 204/159.16; 204/159.19; 427/36; 427/44; 528/75; 427/54.1; 525/408; 525/528; 528/69
[58] Field of Search .............. 260/859 R; 528/69, 75; 204/159.15, 159.16, 159.19; 525/455, 404, 528; 427/54.1, 44, 36

[56] References Cited

U.S. PATENT DOCUMENTS

| | | | |
|---|---|---|---|
| 2,606,892 | 8/1952 | Kropa et al. | 526/78 |
| 2,727,020 | 12/1955 | Melamed et al. | 526/310 |
| 2,882,259 | 4/1959 | Graham | 260/45.5 R |
| 3,076,788 | 2/1963 | Hoover | 526/312 |
| 3,530,100 | 9/1970 | D'Alelio | 204/159.16 |
| 3,579,482 | 5/1971 | Brotherton et al. | 526/312 |
| 3,641,199 | 2/1972 | Niederhauser et al. | 260/859 R |
| 3,642,943 | 2/1972 | Noel | 260/859 R |
| 3,700,643 | 10/1972 | Smith et al. | 204/159.19 X |
| 3,719,638 | 3/1973 | Hüemmer et al. | 260/859 X |
| 3,782,961 | 1/1974 | Takahashi et al. | 204/159.15 X |
| 3,864,133 | 2/1975 | Hisamatsu et al. | 204/159.15 X |
| 3,882,003 | 5/1975 | Mani et al. | 204/159.16 |
| 3,928,299 | 12/1975 | Rosenkranz et al. | 96/35.1 X |
| 3,931,092 | 1/1976 | Ramlow et al. | 260/33.4 R |
| 4,008,247 | 2/1977 | Tucker | 260/29.6 R X |
| 4,014,845 | 3/1977 | Grier et al. | 260/318 R |
| 4,014,846 | 3/1977 | Ramlow et al. | 260/33.2 R |
| 4,082,634 | 4/1978 | Chang | 204/159.15 |
| 4,082,710 | 4/1978 | Vrancken et al. | 260/23 TN |
| 4,139,436 | 2/1979 | Jasani | 204/159.16 |

FOREIGN PATENT DOCUMENTS

| | | |
|---|---|---|
| 898306 | 6/1962 | United Kingdom . |
| 1187195 | 4/1970 | United Kingdom . |
| 1202777 | 8/1970 | United Kingdom . |
| 1252099 | 11/1971 | United Kingdom . |
| 1384343 | 2/1975 | United Kingdom . |

*Primary Examiner*—Ronald H. Smith
*Assistant Examiner*—Thurman K. Page

[57] ABSTRACT

Addition polymerizable polyethers having pendant ethylenically unsaturated urethane groups are usefully employed as flooring materials and in other applications utilizing radiation curable or chemically curable materials. Such urethane polyethers are advantageously prepared by reacting a polyether polyol such as a hydroxy terminated polypropylene glycol with an isocyanatoalkyl ester of an ethylenically unsaturated acid such as 2-isocyanatoethyl methacrylate.

9 Claims, No Drawings

ADDITION POLYMERIZABLE POLYETHERS HAVING PENDANT ETHYLENICALLY UNSATURATED URETHANE GROUPS

BACKGROUND OF THE INVENTION

This invention relates to polyethers having pendant ethylenically unsaturated groups that undergo addition polymerization upon exposure to suitably active radiation and/or chemical initiation.

The use of organic polymers in coating compositions for application on a wide variety of substrates such as floor materials, appliance housings, paper products, etc., is well known. Characteristically, such polymers are often either thermoplastic or thermosettable. For many coating applications, the thermoplastic polymers do not exhibit the necessary resistance to abrasion and organic solvents. Unfortunately, the heat curable, thermosettable polymers are usefully applied only to substrates that can tolerate the temperatures often required to cure such polymers. In addition, thermal curing processes are often too time consuming to be economical in many applications.

Thus, it has been desirable to develop polymers which cure by non-thermal means such as by moisture cure or radiation cure techniques. Moisture curable polymers are often unsatisfactory because of the restrictions of temperature and relative humidity necessary to achieve a crosslinked coating. Also, the time period required to achieve complete cure (two to three weeks) is often impractical.

Polymers, which upon exposure to light or comparable radiation source crosslink to form insoluble materials, exhibit the most desirable properties in that they generally are cured rapidly and can be applied to heat sensitive substrates. Accordingly, such radiation curable polymers are often useful in coating applications as varnishes and inks as well as finish coats on flooring and other items such as counter tops. Such applications usually require that the resulting insoluble, crosslinked coating by non-yellowing, abrasion resistant and stain resistant.

Unfortunately, many of the conventional radiation curable polymers, such as epoxy acrylates, now being employed in conventional, UV curable varnish and ink formulations are particularly sensitive to light, especially sunlight, in that they yellow and craze after relatively brief periods of exposure. Other conventional radiation curable compositions contain very toxic substances such as monomeric or unreacted isocyanate, hydroxyalkyl esters of acrylic acid and the like. Examples of conventional radiation curable and photo curable polymeric materials are described in U.S. Pat. Nos. 3,928,299 and 3,924,033.

In view of the aforementioned deficiencies of conventional radiation curable polymeric compositions, it is highly desirable to provide a relatively nontoxic substance which crosslinks readily and quickly upon exposure to low doses of relatively low energy radiation and/or chemical initiation to form a crosslinked coating exhibiting long-term toughness, abrasion resistance and stain resistance.

SUMMARY OF THE INVENTION

In one aspect the present invention is an addition polymerizable polyether comprising a polyether backbone having at least one pendant ethylenically unsaturated aliphatic urethane group which reacts upon exposure to (1) suitably active radiation, hereinafter called actinic radiation, and/or (2) chemical initiation. The polyether backbone is advantageously poly(hydrocarbyleneoxy) wherein the hydrocarbylene is a divalent hydrocarbon moiety having at least 2 carbons, preferably alkylene having at least 2 carbons. The ethylenically unsaturated urethane group is more specifically characterized as an oxycarbonylamino aliphatic ester of $\alpha,\beta$-ethylenically unsaturated carboxylic acid wherein oxycarbonylamino is a moiety represented by the formula:

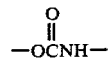

Hereinafter, this addition polyether having at least one pendant ethylenically unsaturated aliphatic urethane group shall be referred to as a urethane polyether.

In another aspect, the present invention is a method for coating substrates such as floors, wood panels, paper, plastic sheets or sheet metal with a coating composition comprising the aforementioned polymer (hereinafter called urethane polyether) and subsequently crosslinking said polymer, by exposure to radiation, or chemical initiation, to form a relatively hard, tough, abrasion and chemical resistant coating which adheres to the substrate.

In yet another aspect, the present invention is an addition polymerizable composition comprising the aforementioned urethane polyether and at least one addition polymerizable monomer which is copolymerizable therewith.

In addition to the advantageous use of the urethane polyether in coating applications, such polymers are also useful in ink and varnish formulations and in other conventional compositions requiring a radiation curable polymer. These urethane polyethers are also useful in compositions employing other means of free radical polymerization such as chemical free-radical generators, e.g., peroxygen and azo compounds. In such compositions, these addition polymerizable urethane polyethers may be copolymerized with other addition polymerizable monomers such as styrene, acrylonitrile, butadiene, ethyl acrylate and the like. These compositions and the resulting copolymers are useful in the manufacture of foams, elastomers, moldings and the like.

DETAILED DESCRIPTION OF THE PREFERRED EMBODIMENTS

The radiation curable urethane polyethers of this invention are preferably those represented by the formula:

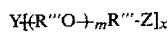

wherein Y is hydroxyl, oxyhydrocarbyl, oxycarbonyl hydrocarbyl, an oxycarbonylamino aliphatic hydrocarbyl ester of an $\alpha,\beta$-ethylenically unsaturated carboxylic acid or a residue of an active hydrogen initiator suitably employed in preparation of a polyether; each Z is individually hydroxyl oxyhydrocarbyl, oxycarbonyl hydrocarbyl or said oxycarbonylamino aliphatic hydrocarbyl ester group provided that the polyether contain at least one of said oxycarbonylamino ester groups, R''' is alkylene or haloalkylene; m is a whole number such that $+R'''O)_m$-R'''- has a number average molecular weight ($M_n$) from about 100 to about 100,000, especially from about 250 to about 10,000; and X is a whole number from 1 to 8, especially from 2 to 3. For the purposes of this invention, hydrocarbyl is a monovalent hydrocarbon moiety such as aryl, alkyl, alkenyl and the like.

The more preferred urethane polyethers of the present invention have polyalkyleneoxy backbones bearing at least one pendant ethylenically unsaturated urethane group represented by the formula:

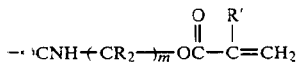

wherein each R is independently hydrogen, alkyl or comparable inert substituent; R' is hydrogen, lower alkyl ($C_1-C_4$) or

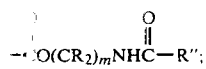

R" is an inert group such as alkoxy or polyalkylenoxy and m is a whole number preferably 1 to 6, more preferably 2 to 4, and most preferably 2.

The urethane polyethers of the present invention are most advantageously prepared by first polymerizing in a known manner a diol such as ethylene glycol, propylene glycol or butylene glycol; comparable epoxy compounds such as ethylene oxide, propylene oxide, epichlorohydrin or epibromohydrin; or polyol other than a diol. Such polymerizations are normally carried out in the presence of an active hydrogen initiator and a Friedel-Crafts catalyst by charging the reactants to a closed vessel and heating them until polymerization is complete. Alternatively, the polyether may be prepared using a conventional base catalyzed process. Suitable polyether polyols and methods for preparing them are described in the following references which are incorporated herein by reference: U.S. Pat. Nos. 2,891,073; 3,058,921; 2,871,219 and British Pat. No. 898,306.

The resulting polyether polyol is recovered in a conventional manner and reacted with an isocyanatoalkyl ester of an α,β-ethylenically unsaturated carboxylic acid under conditions sufficient to cause the isocyanato group to react with a hydroxy group of the polyether polyol to form a urethane linkage. Advantageously, this reaction is carried out in the presence of a urethane catalyst such as amine or an organometallic catalyst, preferably an organometallic catalyst such as stannous octoate or dibutyltin dilaurate. The conditions employed in carrying out the urethane reaction involve maintaining the reaction mixture of the polyether polyol and isocyanatoalkyl ester, preferably neat, or alternatively dissolved in a non-reactive solvent such as ethyl acetate, toluene or cellosolve acetate at a temperature from ambient to 140° C. in a vessel for a reaction time from about 1 to about 24 hours. The amounts of the isocyanatoalkyl ester can be stoichiometric or slightly in excess of the pendant hydroxy groups of the polyether polyol. However, the amount of ester is suitably less than stoichiometric amounts, particularly if only partial capping of the polyol is desired. The resulting polyether having pendant ethylenically unsaturated urethane groups is generally used without further purification. If a solvent has been used in the reaction, it can be removed, or the composition containing the solvent can be employed as is.

Exemplary isocyanatoalkyl esters used to prepare the desired polyether include 2-isocyanatoethyl methacrylate, 2-isocyanoethyl acrylate, 3-isocyanatopropyl methacrylate, 1-methyl-2-isocyanatoethyl methacrylate and 1,1-dimethyl-2-isocyanatoethyl acrylate with 2-isocyanatoethyl methacrylate being preferred. Suitable methods of preparing said isocyanato esters are well known, e.g., as shown in U.S. Pat. Nos. 2,718,516 and 2,821,544 and British Pat. No. 1,252,099.

The urethane polyether is generally a resinous (solid or semisolid) or viscous liquid material which varies in number average molecular weight ($M_n$) from about 250 to about 100,000, preferably from about 400 to about 10,000, depending on the $M_n$ of the polyether polyol used as a starting material. For purposes of this invention, $M_n$ (number average molecular weight) is determined by measuring percent hydroxyl of the starting polyol.

In preparing a photocurable coating formulation in accordance with the present invention, the aforementioned polyether having pendant ethylenically unsaturated urethane groups is combined with an initiator effective to initiate crosslinking of the polymer on exposure to radiation, hereinafter referred to as a photoinitiator. For this purpose, the photoinitiator is advantageously dithiocarbamates, dithiocarbonates, thiuram compounds, thiazoles and xanthates, as well as α-phenylacetophenone derivatives such as benzil, benzoin and the benzoin ethers, e.g., benzoin-methyl, -ethyl, -n-propyl and -isopropyl ethers. While the amount and type of photoinitiator employed will vary with the intensity and dosage of radiant energy to be employed, the aforementioned photoinitiators are usually employed in amounts from about 0.5 to about 8, preferably from about 1 to about 3, weight percent based on the weight of the coating formulation. Of the foregoing initiators, the benzoin ethers are preferred.

In preparing chemically initiated polymer products using the urethane polyether of the present invention, conventional free radical generating compounds are employed to initiate addition polymerization of the urethane polyether or to initiate copolymerization of the urethane polyether with one or more other ethylenically unsaturated copolymerizable monomers. Exemplary free radical generating compounds which are suitable for this purpose include peroxygen compounds, e.g., peroxides, persulfates, percarbonates, and perborates, as well as azo compounds. Typically, such chemical initiators are employed in amounts effective to cause polymerization, e.g., from about 0.1% to about 10% based on the weight of polymerizable material, e.g., urethane polyether and other monomer(s).

A nonreactive solvent and/or copolymerizable monomer is often employed in the coating formulation in order to reduce viscosity of the formulation and/or to impart additional properties to the resulting crosslinked coating or article. Examples of suitable non-reactive solvents for the urethane polyether include volatile, relatively low viscosity liquid solvents such as aromatic hydrocarbons, e.g., benzene and toluene; esters, e.g., ethyl acetate and cellosolve acetate; chlorinated solvents such as perchloroethylene and 1,1,1-trichloroethane; and ethers such as dioxane, tetrahydrofuran as well as dimethoxydiethylene and other glymes. When used, the non-reactive solvents are normally employed in amounts sufficient to reduce the viscosity of the curable composition, usually from about 5 to about 80, preferably from about 5 to about 30, weight percent based on the combined weight of total curable composition and the solvent. Suitable copolymerizable monomers are monoethylenically and polyethylenically unsaturated monomers which undergo addition polymerization upon exposure to actinic radiation and/or chemical initiation. Examples of suitable monomers for this purpose include monovinylidene aromatics, e.g., styrene, t-butylstyrene and ar-chlorostyrene; polyvinyl aromatics such as divinyl benzene; unsaturated nitriles such as acrylonitrile; conjugated aliphatic dienes, e.g., butadiene; alkyl esters of $\alpha,\beta$-ethylenically unsaturated carboxylic acids, e.g., ethyl acrylate, butyl acrylate and methyl methacrylate; vinyl esters such as vinyl acetate; di- and triesters of $\alpha,\beta$-ethylenically unsaturated carboxylic acid such as trimethylol propane triacrylate and hexanediol diacrylate and the like, including mixtures thereof.

When used, the copolymerizable monomers are normally employed in amounts in the range from about 0 to about 99.98 weight percent based on the total weight of the curable composition, i.e., combined weight of the copolymerizable monomer and urethane polyether. In preparing a radiation curable formulation, the amount of copolymerizable monomer normally employed is in the range of from 0 to about 50 weight percent based on the total weight of the curable composition. In preparing a polymer polyol which can be used as a starting ingredient in the production of a polyurethane molding or a polyurethane foam, the copolymerizable monomer(s) is normally used in amounts in the range of from about 0 to about 99.9, preferably from about 2 to about 70, most preferably from about 5 to about 50, weight percent based on the combined weight of the urethane polyether and the copolymerizable monomer(s). For purposes of this invention, a polymer polyol is a solution or dispersion of any polymer in a polyether polyol.

In addition to the foregoing photoinitiators, nonreactive solvents and copolymerizable monomers, other additives such as impact modifiers (rubber polymers and elastomers), pigments and fillers, stabilizers, fire retardants, etc., can be employed.

The aforementioned coating formulations are readily cast, sprayed or otherwise applied as films or coatings by conventional coating techniques used by those skilled in the art. Typically, the thickness of the film or coating will vary from about 0.0025 to about 0.125 mm, with thicknesses in the range from about 0.010 to about 0.055 mm being preferred.

When radiation curing is to be employed, the coating or film is then exposed to sufficient actinic radiation to cure the coating or film to a material that is insoluble in aqueous or organic liquid media. For purposes of this invention, actinic radiation is any radiation which will cause the desired crosslinking reaction. Preferably, when the radiation curable composition contains methacrylate moieties, the radiation curing step is carried out in atmosphere that is substantially free of oxygen. In order to achieve such a substantially oxygen-free atmosphere, it is sufficient to overlay a thin film of a material which transmits the radiation such as clear plastic on the coating or film to be cured. Other means may be used such as curing the coating or film in a chamber containing an essentially oxygen-free atmosphere such as nitrogen, helium or argon or by curing the coating or film under vacuum. Curable compositions, which contain acrylic instead of methacrylic moieties, need not be irradiated in an oxygen-free environment in all instances.

Examples of actinic radiation advantageously employed include ultraviolet light; accelerated particulate (ionizing) radiation wherein particulates include electrons, protons, neutrons, etc.; X-rays; and the like, with ultraviolet light being preferred. In the case of ultraviolet light radiation, suitable intensity is supplied by mercury vapor lamps.

The following examples are given as illustrative embodiments of the invention and should not be construed as limiting its scope. In these examples, all parts and percentages are by weight unless otherwise indicated.

EXAMPLE 1

Preparation of Urethane Polyether

Into a 250 ml round bottom flask fitted with an air-driven stirrer, a water condenser capped with a drying tube, an addition funnel and a thermocouple controlled heating lamp are placed 51.43 g (0.0509 mole) of a polypropylene glycol having a number average molecular weight, as determined by percent hydroxyl analysis, of 1010, and 2 drops of stannous octoate as catalyst. The contents of the flask are heated to 50° C. and 15.79 g (0.1018 mole) of 2-isocyanatoethyl methacrylate (IEM) is added dropwise over a period of 42 minutes with stirring. Heating of the stirred reaction mixture at approximately 50° C. is continued for a period of 1.4 hours and then the reaction mixture is allowed to cool to room temperature for an additional 2 hours. Analysis of the resulting reaction product by an infrared spectrometer indicates no unreacted isocyanate remains in the reaction mixture. At room temperature, the product is a clear thick liquid which develops white crystals on standing. Upon formulating 50 parts of this liquid with 50 parts of trimethylolpropane triacrylate and exposing a thin layer of the resulting formulation to ultraviolet light, the layer cures to a relatively hard coating which is insoluble in water or hydrocarbon solvents.

EXAMPLES 2–7

Preparation of Urethane Polyether

Following the procedure of Example 1, a 51.6-g portion (0.129 mole) of a polypropylene glycol having a molecular weight of 400 and 3 drops of stannous octoate solution are heated with stirring to 50° C. A 40-g portion (0.258 mole) of IEM is added dropwise over a period of 1.5 hours during which an exotherm to 66° C. is observed. Infrared analysis of the resulting product indicates a complete reaction of the IEM.

Coating Formulation

A formulation consisting of 80 parts of the aforementioned urethane polyether and 20 parts of trimethylolpropane triacrylate is combined with 3 parts of benzoin ether photoinitiator and 0.5 part of methyldiethanolamine. This formulation is cast as a layer onto a phosphate-treated steel substrate and cured to a ~0.03 mm film by repeatedly (five times) passing the coated substrate at the rate of ~30.5 meters per minute under a light source having three 100 watt medium pressure mercury lamps. The resulting coating is tested for impact strength and chemical resistance and the results are reported in the following Table I.

Following the foregoing procedure, several additional compositions (Example Nos. 3–7) employing different urethane polyethers and different reactive diluents are prepared and formed into coatings which are then tested by the procedures described herein, the results of these tests are reported in the following Table I.

cast onto phosphate treated steel panels. The coated panel is covered with poly(ethylene terephthalate) film

TABLE I

| Example No. | Isocyanate Ester/Polyol(1) Type | Mole Ratio | Copolymerizable Monomer (2) Type | Amount pph | Benzoin Ether Photoinitiator pph(3) | Radiation Conditions(5) | Hardness | Solvent Resistance | Toughness in-lb(8) |
|---|---|---|---|---|---|---|---|---|---|
| 2 | IEM/PPG (400) | 2:1 | TMPTA | 20 | 2(4) | 3 × 100w(30.5 MPM) 5 passes | HB | >100 MEK | 4 |
| 3 | IEM/GPPG (260) | 2:1 | PEA | 20 | 2(4) | 3 × 100w 1 pass | 4H | >100 MEK | <4 |
| 4 | IEM/SP (1061) | 7:1 | PEA | 40 | 2(4) | 1 × 200w(30.5 MPM) 5 passes | 2B | 73 MEK | 70 |
|  | IEM/PO-EO (4700) | 2:1 |  |  | 1 wt ratio |  |  |  |  |
| 5 | IEM/PO-EO (4700) | 2:1 wt ratio | TMPTA | 20 |  | 3 × 100w(30.5 MPM) 3 passes | 3H | >100 MEK | 10 |
|  | IEM/GPPG (260) | 2:1 |  |  |  |  |  |  |  |
| 6 | IEM/PO-EO (4700) | 2 wt | TMPTA | 20 |  | 3 × 100w(30.5 MPM) 3 passes | 2H | >100 MEK | 40 |
|  | IEM/PPG (400) | 2:1 ratio |  |  |  |  |  |  |  |
| 7 | IEM/GPPG (260) | 2:0.67 | None | — |  | 3 × 100w(30.5 MPM) 1 pass | 2H | >100 MEK | 12 |

(1)
IEM - 2-isocyanatoethyl methacrylate
PPG (1010) - polypropylene glycol ($M_n$-1010)
PPG (400) - polypropylene glycol ($M_n$-400)
GPPG (260) - glycerine initiated polypropylene glycol ($M_n$-260)
SP (1061) - sorbitol initiated polyol having 7 hydroxyl groups ($M_n$-1061)
PO-EO (4700) - glycerine initiated polyalkylene glycol made from propylene oxide and ethylene oxide ($M_n$-4700)
In Example No. 4, the two specified compositions of Isocyanate Ester/Polyol, copolymerizable monomer and benzoin ether initiator are combined in a 1:1 weight ratio.
In Example Nos. 5 and 6, the two specified Isocyanate Ester/Polyols are combined in a 1:1 weight ratio.
(2) TMPTA - trimethylolpropane triacrylate
PEA - phenoxyethyl acrylate
pph - parts of initiator per hundred parts of urethane polyether plus copolymerizable monomer
(3) parts of benzoin ether photoinitiator per hundred parts of urethane polyether plus copolymerizable monomer
(4) photoinitiator also contains 0.5 part of methyldiethanol amine per hundred parts of urethane polyether plus copolymerizable monomer
(5) Radiation conditions indicated by light source (e.g., 3 × 100w = 3 lamps at 100 watts each), rate of sample travel under light source in meters/minute (MPM) and number of passes under the light source
(6) Coatings are covered with polyethylene terephthalate film during irradiation. Hardness measured by the pencil hardness test, the rating being the hardest pencil that does not scratch the coating surface.
(7) Solvent resistance measured by double rubs with a cotton swab soaked with methyl ethyl ketone.
(8) Toughness measured by a Gardner impact tester with the rating being the greatest number of inches a 1 lb weight can be dropped onto the reverse side of a coated panel (0.635 mm) without rupturing the coating.

Film Testing

Using the cured coatings of Examples Nos. 5 and 6 of the aforementioned Table I, the coatings are tested for resistance to abrasion, discoloration and staining. The results of these tests are reported in Table II.

and passed under three 100 watt medium pressure mercury vapor lamps (15 passes at a rate of 30.5 MPM). The resulting cured coating (thickness ~0.017 mm) has the following properties.
Hardness(6): B
Solvent Resistance(7): 26 MEK

TABLE II

| Example No. | Yellow Resistance(1) Initial YI | YI 500 Hrs | ΔYI | Abrasion Resistance mg/100 Cycles(2) | Stain Resistance(3) Mustard | Lipstick | Ink |
|---|---|---|---|---|---|---|---|
| 5 | 5.088 | 11.327 | 6.239 | 1.1 | Slight | None | Very Faint |
| 6 | 5.742 | 8.201 | 2.459 | 2.6 | " | " | Slight |

(1) ASTM D-1925-66T wherein coatings are applied to Morest paper and cured using 5 passes under 3 × 100 watt lamps at 100 feet per minute. Morest paper, blank, has an initial YI (yellow index) of 10.072 and YI of 16.486 after 500 hours. Increase in yellow is indicated by ΔYI. An uncoated (blank) Morest paper exhibits a ΔYI of 6.414.
(2) Tabor Abrasion - - determined by measuring weight loss of coating after 100 cycles with CS-17 wheel and a 1000 g weight. A coating exhibiting a weight loss of less than 2 mg under such conditions has superior abrasion resistance. A loss of less than 15 mg/100 cycles indicates acceptable abrasion resistance.
(3) The staining agent is applied to the coating, allowed to remain for 5 minutes and then wiped off with tissue paper soaked with ethanol.

EXAMPLE 8

Eighty parts of the blend of radiation curable urethane polyethers of Example 6 is combined with 20 parts of styrene and 3 weight parts of benzoin ether photoinitiator. A coating of the resulting formulation is Toughness(8): >140 in-lbs
Tape Adhesion(9): >95%
wherein (6) through (8) are the same as in Table I and (9) is a crosshatch adhesion test wherein the coating scored with a sharp instrument into 100 squares/square inch and then adhered to a pressure sensitive, glass reinforced adhesive tape. The tape is pulled quickly from the crosshatched section. Adhesion is determined by percent of squares remaining on the panel.

EXAMPLE 9

In the preparation of the urethane polyether of Example 7, 50 g (0.588 equivalent) of glycerine initiated polypropylene glycol ($M_n$-260) is combined with 0.0191 g of hydroquinone and 2 drops of stannous octoate catalyst and heated to 50° C. To these ingredients a 45.64 g-portion (0.294 equivalent) is added with stirring over a period of 1.7 hours with an exotherm to 59° C. being observed. The resulting polyether has both pendant vinyl and hydroxyl moiety in mole ratio of ~1:1.

A 22.17 g-portion (0.068 equivalent of ethylenic unsaturation, 0.068 equivalent of hydroxyl) of this polymer is combined with 43.42 g (0.417 equivalent of ethylenic unsaturation) of styrene and 41.5 g (0.488 equivalent of hydroxyl) of the polypropylene glycol ($M_n$-260) by mixing such that entrapment of air into the mixture is avoided. To this mixture is added with stirring 81.92 g (0.583 equivalent of NCO) of a prepolymer of toluene diisocyanate and the polypropylene glycol ($M_n$-260) and 0.8 cc of t-butyl perbenzoate catalyst. To the resulting mixture is added 0.5 cc of lead octoate solution (24 percent active) and rapidly mixed into the mixture. The resulting formulation is immediately poured into a 30.5 cm×30.5 cm×0.3 cm aluminum mold. After a few minutes, the molding is removed from the mold and maintained at 60° C. for one hour.

The cured molding is flexible and exhibits more dimensional stability and fewer surface deformities (bumps) than do moldings prepared from conventional instant set polyurethane formulations which employ only styrene as the copolymerizable monomer.

EXAMPLE 10

A radiation curable formulation is prepared by blending 10 g of the urethane polyether of Example 4 with 0.3 g of benzoin ether photoinitiator. This formulation is cast as a film onto a steel substrate and cured by repeatedly (four times) passing the coated substrate at the rate of ~30.5 meters per minute under a light source having three 100-watt medium pressure mercury lamps. The cured coating is soft, but not tacky to touch, and exhibits moderate resistance to organic solvent such as methyl ethyl ketone.

EXAMPLE 11

A 400-g portion (0.0825 mole) of PO-EO (4700) polyglycol as described in Table I is charged into a one liter, 3-necked round bottom flask equipped with an addition funnel, stirrer, condenser, thermocouple and nitrogen sparge. The polyglycol is heated with stirring to 50° C. and 1.112 g (0.0072 mole) of IEM in 50 g of methylene chloride is added to the flask. The resulting mixture is heated to 120° C. at which time 100 g of styrene containing 0.7 g of azobisisobutyronitrile are added with stirring to the mixture over a period of 30 minutes. After an additional 40 minutes, 0.7 g of azobisisobutyronitrile in 15 g of methylene chloride is added to the reaction mixture over a period of 20 minutes. The reaction is allowed to continue for an additional two hours after which time the reaction product is placed under vacuum for 45 minutes. The resulting polymer polyol is a stable dispersion of polystyrene in polyglycol having a Brookfield viscosity (Model RV) of 2912 cps at 18° C. using a #4 spindle operating at 50 rpm.

For purposes of comparison, preparation of a polymer polyol is attempted by following the foregoing procedure except that no IEM is employed. The reaction is stopped after the reaction mixture becomes so viscous that the stirrer is inoperable. The reaction product is not a stable dispersion and is extremely viscous. Thus, it is shown that the reaction product of the polyglycol and the IEM contributes significantly to the formation of a stable dispersion of polystyrene in the polyglycol.

When the stable polymer polyol dispersion of this example is employed as the polymer polyol component in an otherwise conventional process for preparing a high resiliency polyurethane foam, a foam having excellent physical properties is obtained.

What is claimed is:

1. An addition polymerizable polyether having a polyether backbone bearing at least one pendant group which is an oxycarbonylamino aliphatic ester of an α,β-ethylenically unsaturated carboxylic acid.

2. The polyether of claim 1 which is represented by the formula:

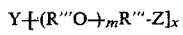

wherein Y is hydroxyl, an oxycarbonylamino ester of an α,β-ethylenically unsaturated carboxylic acid or a residue of an active hydrogen initiator suitably employed in preparation of a polyether; each Z is individually oxyhydrocarbyl, oxycarbonyl hydrocarbyl or said oxycarbonylamino ester group provided that the polyether contains at least one of said oxycarboxylamino ester groups, R''' is alkylene or haloalkylene wherein alkylene has at least two carbons; m is a whole number such that —R'''O$)_m$-R'''- has a number average molecular weight from about 100 to about 100,000, and x is a whole number from 1 to 8.

3. The polyether of claim 2 wherein the oxycarbonylamino ester group is represented by the formula:

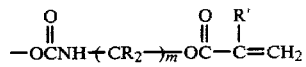

wherein each R is independently hydrogen, alkyl or comparable inert substituent; R' is hydrogen, lower alkyl parable inert substituent; R' is hydrogen, lower alkyl ($C_1$-$C_4$) or

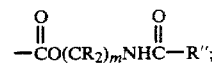

R'' is an inert group such as alkoxy or polyalkylenoxy and m is a whole number preferably 1 to 6, more preferably 2 to 4, and most preferably 2.

4. The polyether of claim 3 wherein the oxycarbonylamino ester group is represented by the formula:

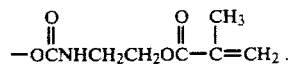

5. A urethane polyether which is the reaction product of a polyether polyol and an isocyanatoalkyl ester of an α,β-ethylenically unsaturated carboxylic acid.

6. The polyether of claim 5 wherein the polyether polyol is a polyethylene glycol or a polypropylene glycol and the isocyanatoalkyl ester is 2-isocyanatoethyl methacrylate.

7. An addition polymerizable composition comprising the urethane polyether of claim 1 and an addition polymerizable monomer which is copolymerizable therewith.

8. The composition of claim 7 wherein the monomer is a monovinylidene aromatic, an ethylenically unsaturated nitrile, a conjugated diene or an ester of an $\alpha,\beta$-ethylenically unsaturated carboxylic acid.

9. The composition of claim 8 wherein the ester is trimethylol propane triacrylate or hexanediol diacrylate.

* * * * *

UNITED STATES PATENT AND TRADEMARK OFFICE
CERTIFICATE OF CORRECTION

PATENT NO. : 4,233,425  Page 1 of 2
DATED : November 11, 1980
INVENTOR(S) : Nancy B. Tefertiller et al.

It is certified that error appears in the above—identified patent and that said Letters Patent is hereby corrected as shown below:

Column 1, line 41, delete "by" and insert --be--.

Column 2, line 62, after "hydroxyl" insert --,--.

Column 4, line 15, delete "or" and insert --of--.

Column 4, line 22, delete "photointia-" and insert --photoinitia---.

Column 7, Table I, in the heading after "Hardness", insert --(6)--.

Column 7, Table I, in the heading after "Resistance", insert --(7)--.

Column 7, Table I, Example No. 4, under the heading "Benzoin Ether Photoinitiator", delete "3 ratio" and insert --ratio--.

Column 7, Table II, in Footnote (2), line 1, before "CS-17", insert --a--.

UNITED STATES PATENT AND TRADEMARK OFFICE
CERTIFICATE OF CORRECTION

PATENT NO. : 4,233,425        Page 2 of 2

DATED : November 11, 1980

INVENTOR(S) : Nancy B. Tefertiller et al.

It is certified that error appears in the above—identified patent and that said Letters Patent is hereby corrected as shown below:

Column 10, line 31, after "individually", insert --hydroxyl--.

Column 10, line 37, delete the formula and insert
-- $(R'''O)_m-R'''-$ --.

Column 10, line 49, delete the entire line.

*Signed and Sealed this*

*Twenty-fourth* Day of *March 1981*

[SEAL]

*Attest:*

RENE D. TEGTMEYER

*Attesting Officer*     *Acting Commissioner of Patents and Trademarks*